Sept. 19, 1939.     E. W. LANDMEIER     2,173,206
SOLDERLESS LUG
Filed June 10, 1937
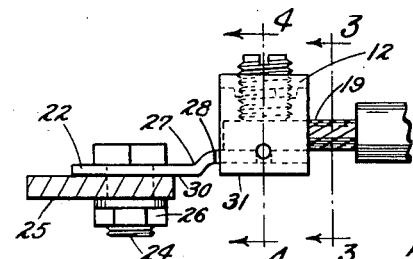
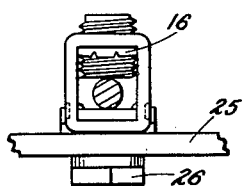
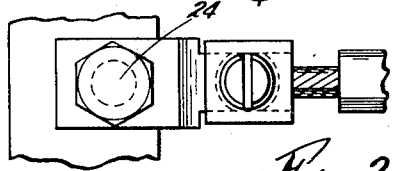
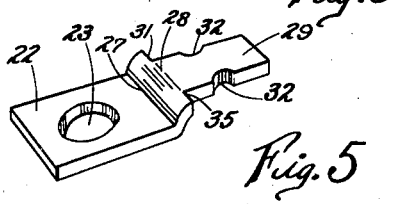
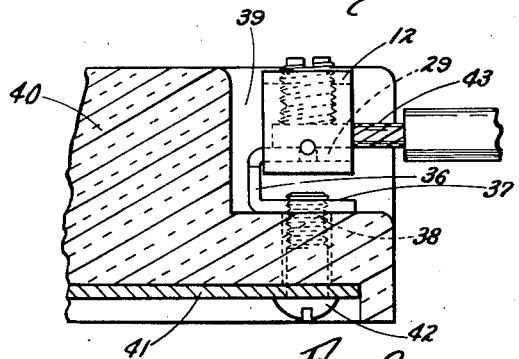
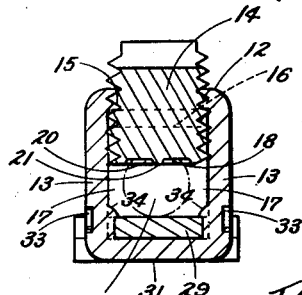
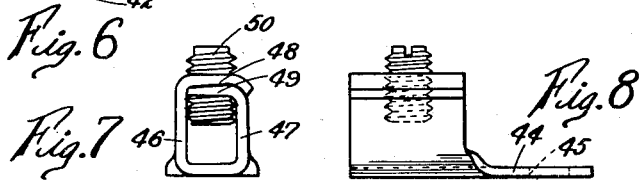
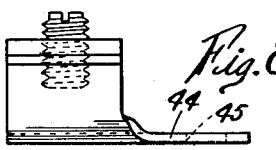
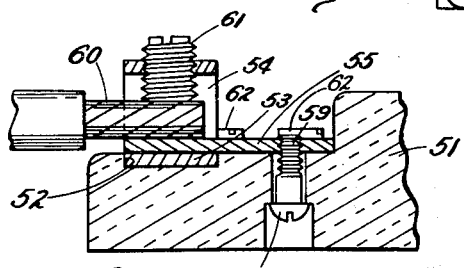
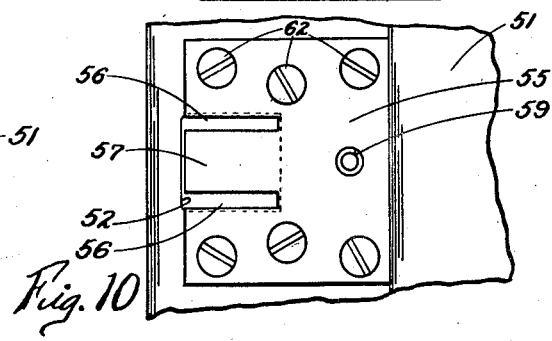
INVENTOR
Edwin W. Landmeier.
BY Murray Sackhoff & Paddack.
ATTORNEYS Patented Sept. 19, 1939

2,173,206

UNITED STATES PATENT OFFICE 2,173,206

SOLDERLESS LUG

Edwin W. Landmeier, Covington, Ky., assignor to The Wadsworth Electric Manufacturing Company, Covington, Ky., a corporation of Kentucky Application June 10, 1937, Serial No. 147,512

2 Claims. (Cl. 173—269)

The present invention relates to solderless lugs for use in effecting terminal connections for electrical conductor wires or cables in various electrical installations.

Heretofore, electrical connections of the character represented in the scope of utility of the present invention have been made principally by means of soldering or sweating the conductors or terminals to the wire or cable conductors. This ordinary practice entails troublesome effort and sometimes produces unsatisfactory connections. Solderless connectors heretofore known and used have been objectionable in various respects, including excessive cost and complicated structure, the requirement for too many sizes and forms of device to make up a complete line or assortment, and the likelihood of separation and loss of parts in some instances during the handling or installation thereof.

The present invention has for an object the provision of solderless lugs that are sturdy, inexpensive, and efficient in construction and which are free of the disadvantages enumerated.

A further object of the invention is to provide a solderless lug in which the wire receiving collar or socket may have perforate connector plates of various forms associated therewith so that a material reduction is effected in the equipment required for the production thereof.

Another object of the invention is to provide a solderless lug so arranged that an efficient mechanical and electrical connection is made with a wire or cable by the direct application of a set screw thereto.

Still another object of the invention is to so fabricate the parts of the lug that high mechanical strength is provided where most needed without resorting to excessively heavy materials.

These and other objects are attained by the means described herein and disclosed in the accompanying drawing, in which:

Fig. 1 is a side elevational view showing one form of the device of the invention in operative position connecting a conductor cable with a bus-bar.

Fig. 2 is a top plan view of the structure shown in Fig. 1.

Fig. 3 is an end elevational view of the structure shown in Fig. 1 looking in the direction of the arrows on line 3—3.

Fig. 4 is an enlarged vertical sectional view taken on line 4—4 of Fig. 1.

Fig. 5 is a perspective view showing a connector plate forming a detail of the invention as disclosed in Figs. 1 to 4, inclusive.

Fig. 6 is an elevational view of a modified form of the device shown in Fig. 1.

Fig. 7 is an end elevational view of another form of the solderless lug of the invention.

Fig. 8 is a side elevational view of the device shown in Fig. 7.

Fig. 9 is a fragmental longitudinal sectional view of still another modified form of the device of the invention operatively mounted upon an insulating base.

Fig. 10 is a top plan view of the device of Fig. 9, parts being removed.

In its broader aspects the present invention consists in the provision of a collar or sleeve for the reception of an inserted conductor wire or cable, a connector plate associated therewith and a set screw traversing the interior of the collar to mechanically and electrically bond the collar, inserted conductor, and the conductor plate.

Referring now to the drawing and particularly to Figs. 1 and 4, the device of the invention in its preferred form comprises a rigid collar 12 having opposed side walls 13, the inner faces of which are desirably spaced apart at a distance slightly less than the outside diameter of a set screw 14 which is inserted into the collar in a thread bore 15. The collar 12 is of suitable conducting material and is desirably made of hard drawn copper so that in the tapping of the threaded bore 15, an inwardly extending flange 16 is formed, thereby providing an additional thread or threads in the tapping bore. The spacing of the inner faces of the walls 13 of the collar is such that in tapping the threads in the collars under normal production methods, one or both of the interior faces 17 of collar 13 are cut or grooved by the tapping to provide additional lands upon which the threads of set screw may engage on diametrically opposite sides of the set screw. By this arrangement the space between the inner faces 17 of side walls 13 is completely spanned by the bottom end 18 of set screw 14 so that no undesirable deformation of an inserted conductor 19 results when the set screw is driven against it.

It is to be further noted that the provision of the interrupted thread engagement of the set screw on the side walls of the collar serves to translate any deformation strains on the body of the collar into a more complete and strongly binding action of the side walls on the contacting portions of the threads on the set screw. This relationship of parts is desirably included in all forms of the device of the invention, since, in addition to the increased strength and rigidity of connection, it permits the elimination of a clamp plate between the end of the screw and the inserted conductor such as 19. By providing in the end of set screw 14 a shallow cup 20 and a centrally disposed flat point 21 a beneficial degree deformation or bight is attained between the set screw and inserted conductor. It will be understood that with but few different sizes of collars, each of which will accommodate a reasonable range of conductor sizes, solderless lugs of the invention are provided to meet any problem of electrical connection that may be encountered.

The connector plate, which in use is either bolted or screwed to a rigid portion of an association of electrical parts, may be made integral, or permanently associated, or may be removably associated with the collar of the invention. In the embodiment of the device as shown in Figs. 1 to 4 inclusive, the connector plate 22 has a suitable perforation 23 for the reception of a bolt 24 so that it may be mounted on a busbar such as 25 upon application of a nut 26. The connector plate 22 prior to its assembly into the solderless lug is illustrated in Fig. 5. It will be noted that the plate 22 is abruptly offset at 27 and 28 whereby a tongue 29 of reduced width is disposed in offset relation to the perforated portion of plate 22 sufficiently to bring the bottom face 30 of plate 22 into substantially the same plane as the bottom face 31 of the collar 12. The opposed edges of tongue 29 are oppositely notched as at 32 and in assembly this tongue is inserted into the bottom interior of the collar which is then punched in or indented as at 33 to displace small portions 34 of the material of the collar and move them into said notches 32 and overlapping the tongue. The shoulders 35 which result from the formation of tongue 29 on the plate are thus held substantially in abutment with the end edges of side walls 13 of the collar so that a very strong mechanical connection between the connector plate 22 and the collar results. Upon insertion of a set screw such as 14, the solderless lug of great mechanical strength and ease of installation is completed.

In making electrical connections between any rigid electrical conductor such as a busbar and a flexible or bendable conductor such as a cable or wire, the solderless lug may be installed by first bolting it into position on the rigid conductor and thereafter inserting the bare end of a wire or cable into the collar and driving the set screw firmly down onto the latter with sufficient force to effect a secure mechanical and good electrical bond. It is to be further noted that the order of procedure just described may be reversed if desired or more convenient, namely, the cable may be secured within the collar and the perforate plate 22 subsequently bolted to the rigid electrical conductor.

In the embodiment illustrated in Fig. 6, the connector plate indicated at 36 carries the identical notched tongue structure 29 and is connected with the collar 12 in the manner just described but the plate takes a generally U-shaped form wherein the arm 37 of the plate is turned back under and in spaced relation to tongue 29. In this embodiment it is also desirable in some instances to provide a tapped bore 38 in lieu of a perforation such as 23 in the device shown in Fig. 5.

The structure disclosed in Fig. 6 permits of very compact mounting, for example, as in a recess 39 in an insulating base 40. A concealed busbar 41, remote from the recess 39, may be electrically connected to the solderless lug by a screw 42 passing through the busbar and into threaded engagement in the perforation 38. This provides a secure and compact mechanical mounting as well as a good electrical connection by the member 41 and an inserted member such as cable 43. The cable 43 is connected to the solderless lug in the manner previously described.

The modified construction illustrated in Figs. 7 and 8 embodies the same principle of good mechanical and electrical bonding of an inserted conductor wire and a rigid conductor heretofore described, the structural modification residing in the provision of a one-piece formed stamping in lieu of the separately formed collar and plate of the devices shown in Figs. 1 to 6, inclusive.

In the device of Figs. 7 and 8 a substantially T-shaped stamping affords a conductor plate 44 with a bolt receiving perforation 45 and an integral pair of arms 46 and 47 which are turned upwardly at substantially right angles to the plate 44 in approximately parallel relation and which are then turned towards each other in overlapped relation providing a double top wall for the collar consisting of the overlapped ends 48 and 49 of the arms. The overlapped top wall structure is then tapped after the fashion described in connection with the device of Fig. 4 and a set screw 50 is inserted to complete the unitary solderless lug. In the construction just described it will again be apparent that any strain imposed on the structure as a result of forcing the set screw 50 into binding relation with an inserted wire or cable will be translated into an additional binding of the inner faces of side walls 46 and 47 against the contiguous threads of the set screw.

In the several forms of the device heretofore described the connector plate has been shown as either integral or inseparably associated with the collar. The device of the invention as illustrated in Figs. 9 and 10 is intended primarily for use with specially formed porcelain or insulating bases such as 51 wherein a recess such as 52 may be provided to receive the thickness of the bottom wall 53 of a collar 54. An enlarged connector plate 55 has a pair of slots 56 extending inwardly from one edge thereof so that the resultant tongue 57 may be inserted in the collar 54 with the side walls of each slot 56 straddling one of the side walls of the collar 54; thereupon, the plate and collar thus slidably associated are seated on the insulating base 51 in the position best illustrated in Fig. 9. A screw 58 passing through the insulating base and engaging the threaded bore 59 of the plate serves to simultaneously secure the plate to the insulating base and to lock the collar 54 securely in position. When a conductor or cable 60 is inserted in the collar and set screw 61 driven snugly into engagement therewith, a good electrical bond is established between the cable and plate and at the same time a tongue 57 of the plate is additionally secured to the collar. In the embodiment shown in Figs. 9 and 10 plate 55 is of somewhat extended size so as to provide a plurality of screw terminals 62. The foregoing illustrated and described embodiments of the invention serve as examples of the adaptation of the invention to respective forms of solderless lugs. It will be understood, however, that the invention is not to be considered as limited to the specific structural shapes disclosed since they may be modified within the spirit of the invention and the scope of the appended claims.

What is claimed is:

1. In a solderless lug the combination of an elongated collar having a pair of opposed substantially parallel walls connected together at opposite edges by a second pair of opposed walls, a shouldered connector plate comprising a tongue portion having notches therein and seating on the interior face of one of said opposed connecting walls of the collar, the other of said pair of opposed connecting walls having a threaded bore therein slightly greater in diameter than the space between the substantially parallel walls, and a set screw extending into said perforation, and adapted upon advancement into the collar to engage the threads thereof in the parallel walls of the collar, said parallel walls being indented inwardly into the notches in said tongue portion for interlocking non-removable connection of the tongue and collar.

2. In a connector the combination of a plate, an integral tongue thereon providing shoulders at the junction of the plate, said tongue having notches in its opposite edges, a rectangular collar having substantially parallel sidewalls interiorly spaced apart to receive the tongue between them, said sidewalls being indented into and above said notches for non-removably fixing the tongue in said collar and holding the end of the collar in abutment with said shoulders, and a set screw of a diameter slightly exceeding the width of the tongue and threadedly adjustable through the top wall and engaging upon the opposed inner faces of said side walls of the collar.

EDWIN W. LANDMEIER.